United States Patent
Cai et al.

(10) Patent No.: US 7,542,104 B2
(45) Date of Patent: Jun. 2, 2009

(54) LIQUID CRYSTAL DISPLAY DEVICE WITH POWER CONNECTION STABILIZER

(75) Inventors: Zhi-Yuan Cai, Shenzhen (CN); Te-Hsu Wang, Miao-Li (TW); Chih-Jen Sun, Miao-Li (TW)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 360 days.

(21) Appl. No.: 11/474,626

(22) Filed: Jun. 26, 2006

(65) Prior Publication Data

US 2006/0289830 A1  Dec. 28, 2006

(30) Foreign Application Priority Data

Jun. 24, 2005  (TW) .............................. 94210711 U

(51) Int. Cl.
*G02F 1/1333* (2006.01)
*G02F 1/1345* (2006.01)
*H01R 13/625* (2006.01)
*H01R 13/627* (2006.01)

(52) U.S. Cl. .................. 349/58; 349/149; 439/345; 439/363

(58) Field of Classification Search ............. 349/58–60, 349/149; 439/298–894; 361/679–685
See application file for complete search history.

(56) References Cited

U.S. PATENT DOCUMENTS

| | | | | |
|---|---|---|---|---|
| 3,811,104 | A * | 5/1974 | Caldwell | 439/135 |
| 4,652,069 | A * | 3/1987 | Smith | 439/369 |
| 5,011,427 | A * | 4/1991 | Martin | 439/373 |
| 5,283,475 | A * | 2/1994 | Berger | 307/141.4 |
| 5,655,924 | A * | 8/1997 | Cross et al. | 439/373 |
| 6,268,998 | B1 * | 7/2001 | Cho | 361/681 |
| 6,339,418 | B1 | 1/2002 | Kitagawa | |
| 7,014,493 | B1 * | 3/2006 | Battard | 439/373 |
| 2004/0184856 | A1 * | 9/2004 | Silverbrook | 400/62 |

* cited by examiner

*Primary Examiner*—Frank G Font
*Assistant Examiner*—Robert Tavlykaev
(74) *Attorney, Agent, or Firm*—Wei Te Chung

(57) ABSTRACT

An exemplary liquid crystal display device (1) includes a liquid crystal module (10), a circuit board (12), a chassis (16), and a stabilizing clip (18). The circuit board and the liquid crystal module are received in the chassis. The circuit board includes a power socket (122). The liquid crystal module includes a plug (104) electrically connecting with the power socket. The stabilizing clip is detachably engaged with the chassis and the power socket, whereby movement of the plug relative to the power socket is restricted or eliminated.

19 Claims, 5 Drawing Sheets

LIQUID CRYSTAL DISPLAY DEVICE WITH POWER CONNECTION STABILIZER

FIELD OF THE INVENTION

The present invention relates to liquid crystal display (LCD) devices, and more particularly to a liquid crystal display device with a stabilizing clip for stabilizing a power output connection thereof.

GENERAL BACKGROUND

Liquid crystal display devices are commonly used as display devices for compact electronic apparatuses, because they not only provide good quality images with little power but also are very thin. The liquid crystal molecules in a liquid crystal display device do not emit any light themselves. The liquid crystal molecules have to be lit by a light source, such as a cold cathode fluorescent lamp (CCFL) or a hot cathode fluorescent lamp (HCFL), so as to clearly and sharply display text and images. In general, a power cord electrically connects the light source with an internal power socket located at a circuit board of the liquid crystal display device. Thereby, the power socket can channel electric power to the light source.

Referring to FIG. 7 and FIG. 8, a typical liquid crystal display device 8 includes a pair of light sources (not visible), and two pairs of power connection assemblies 80 for conveying electric power to the light sources respectively. The light sources are linear illuminators such as cold cathode fluorescent lamps. Each light source includes a first end and an opposite second end. Each power connection assembly 80 includes a power socket 81, a plug 83, and a lead 85. A first end of one lead 85 in each pair of power connection assemblies 80 electrically connects with the first end of one corresponding light source, and a first end of the other lead 85 in each pair of power connection assemblies 80 connects with the second end of the corresponding light source. An opposite second end of each lead 85 in each pair of power connection assemblies 80 is terminated by a corresponding plug 83. Each plug 83 is connected in a corresponding power socket 81. In operation, each pair of power sockets 81 obtains electric power for the corresponding light source via a power line within the liquid crystal display device 8, and the electric power is conveyed to the light source via the plugs 83 and the leads 85. Thereby, the light source is activated and provides light beams for the liquid crystal display device 8. However, the plug 83 is liable to loosen or disconnect when the liquid crystal display device 8 is subjected to vibration or shock during operation. As a result, the connection between the plug 83 and the power socket 81 may become faulty or may even be lost altogether. When this happens, a display provided by the liquid crystal display device 8 may be impaired. Furthermore, there is a risk of shorting and an outbreak of fire.

What is needed, therefore, is a liquid crystal display device that can overcome the above-described deficiencies.

SUMMARY

An exemplary liquid crystal display device includes a chassis, a circuit board, a liquid crystal module, and a stabilizing clip. The circuit board and the liquid crystal module are received in the chassis. The circuit board includes a power socket. The liquid crystal module includes a plug electrically connecting with the power socket. The stabilizing clip is detachably engaged with the chassis and the power socket, whereby movement of the plug relative to the power socket is restricted or eliminated.

Other advantages and novel features will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe the preferred embodiments in detail.

Figure 1:
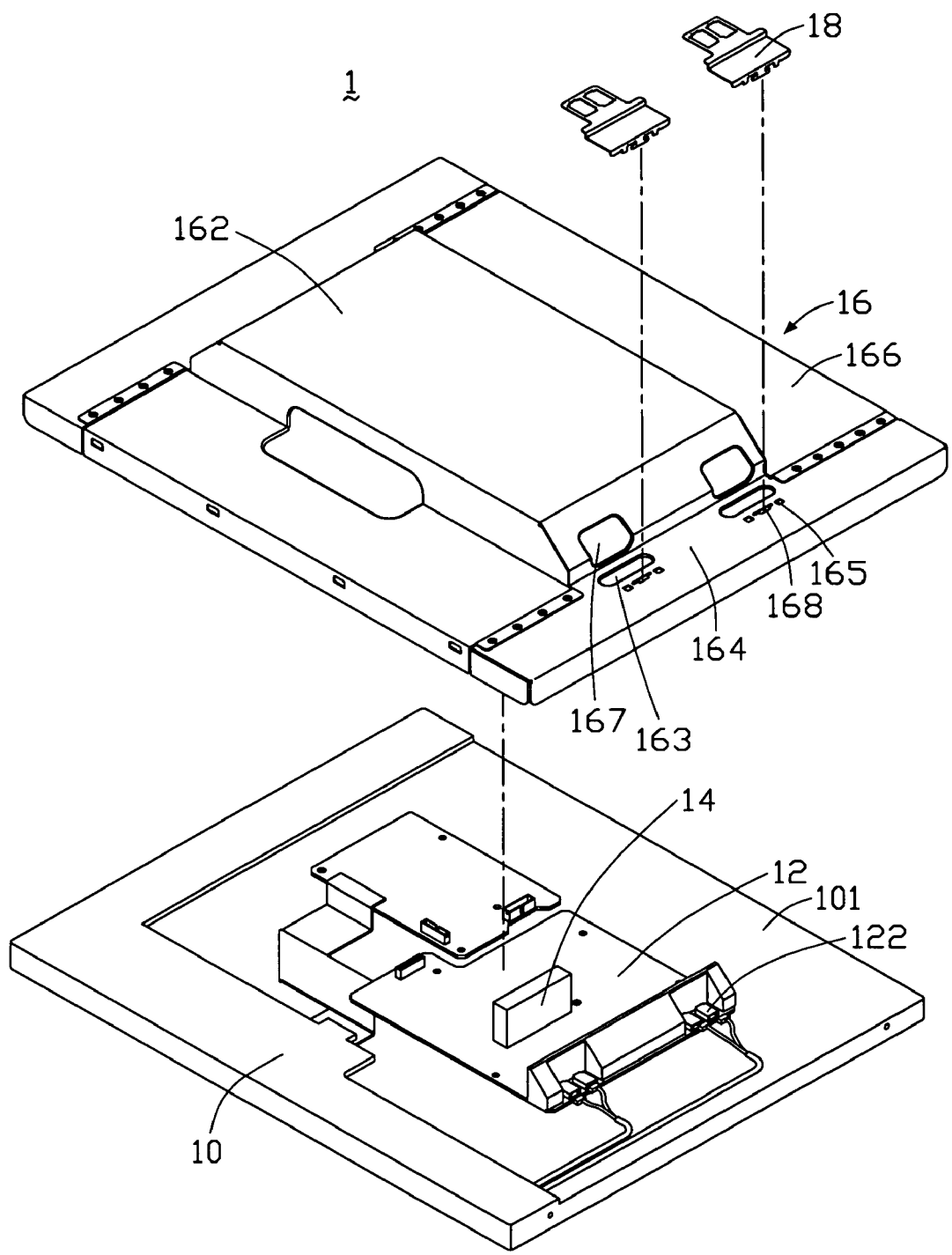
FIG. 1 is an exploded, isometric view of a liquid crystal display device according to a preferred embodiment of the present invention, the liquid crystal display device including two stabilizing clips.
Figure 2:
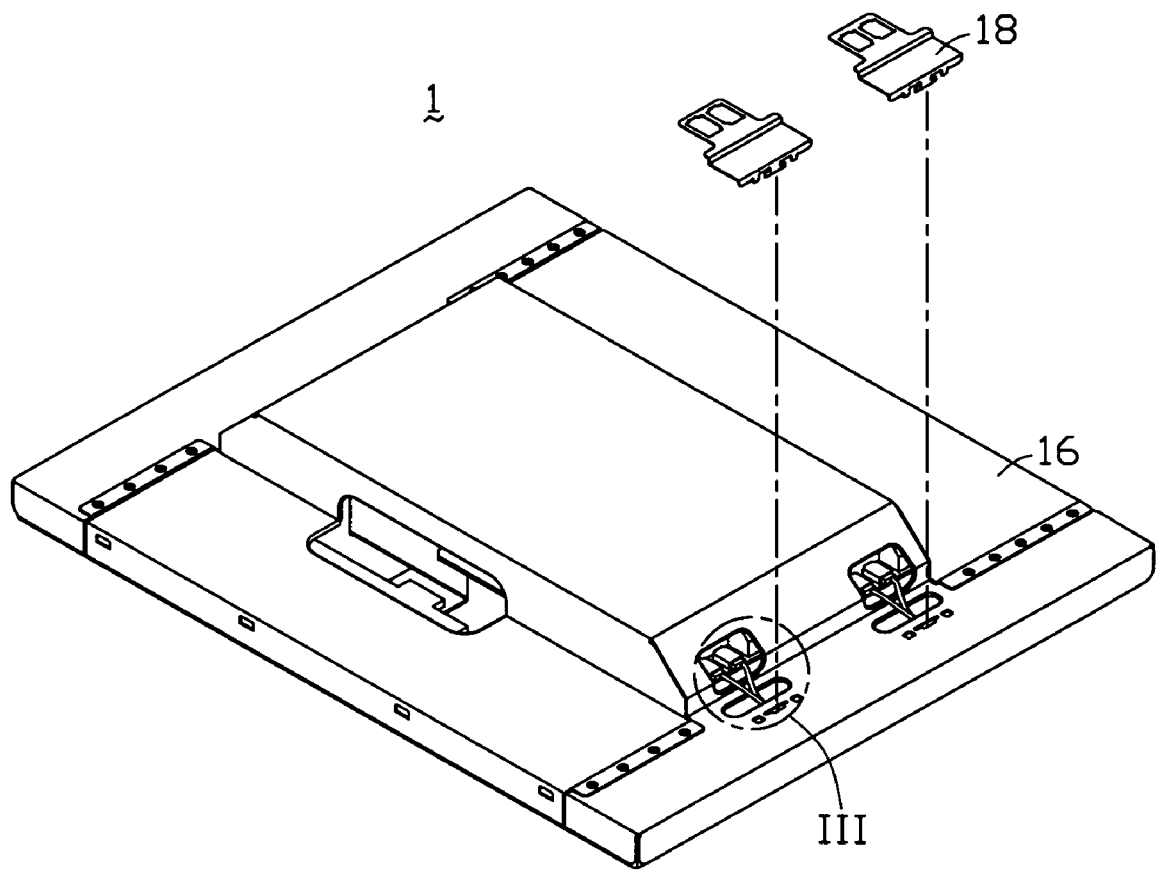
FIG. 2 is a partly assembled view of the liquid crystal display device of FIG. 1.

Referring to FIG. 1 and FIG. 2, a liquid crystal display device 1 according to a preferred embodiment of the present invention includes a liquid crystal module 10, a circuit board 12, a heat sink 14, a chassis 16, and a pair of stabilizing clips 18. The circuit board 12 is arranged at a back surface 101 of the liquid crystal module 10. The chassis 16 covers the liquid crystal module 10 and the circuit board 12. The heat sink 14 connects with a center portion of the circuit board 12. The stabilizing clips 18 are fixed to the chassis 16, adjacent to the circuit board 12.

Figure 3:
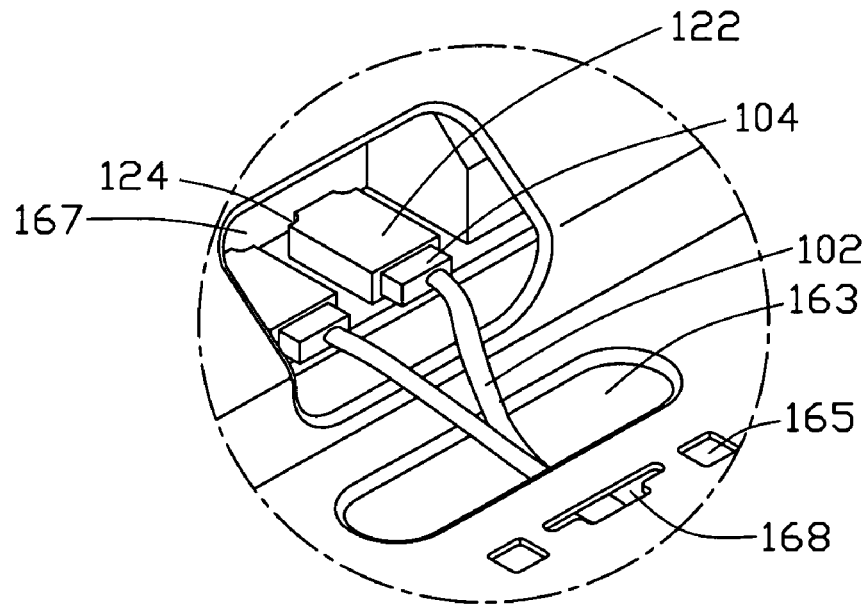
FIG. 3 is an enlarged view of a circled portion III of FIG. 2.

Also referring to FIG. 3, the circuit board 12 includes two pairs of power sockets 122 mounted on a same lateral side (not labeled) thereof. The power sockets 122 are arranged in a line along the side of the circuit board 12, and are oriented parallel to each other. Each power socket 122 is substantially rectangular, and includes two curved cutouts 124 at two adjacent corners (not labeled) thereof that are nearest to the heat sink 14. The circuit board 12, in general, is a printed circuit board (PCB).

The liquid crystal module 10 includes a pair of light sources (not visible), two pairs of leads 102, and two pairs of plugs 104. The light sources are linear illuminators, and preferably are cold cathode fluorescent lamps. Each light source includes a first end and an opposite second end. A first end of one lead 102 in each pair of leads 102 connects with the first end of one corresponding light source, and a first end of the other lead 102 in each pair of leads 102 connects with the second end of the corresponding light source. An opposite second end of each lead 102 in each pair of leads 102 is terminated by a corresponding plug 104. Each plug 104 is connected in an outer end of a corresponding power socket 122, said outer end being opposite to the cutouts 124 of the power socket 122. In operation, each pair of power sockets 122 obtains electric power for the corresponding light source via a power line within the liquid crystal display device 1, and the electric power is conveyed to the light source via the plugs 104 and the leads 102. Thereby, the light source is activated and provides light beams for the liquid crystal display device 1.

The chassis 16 is substantially rectangular, and includes an offset back wall 162, two first side walls 164, and two second side walls 166. The first side walls 164 are integrally formed with the back wall 162, and extend from two opposite first edges (not labeled) of the back wall 162 respectively. The second side walls 166 extend from two opposite top and bottom edges of the back wall 162 respectively. The first side walls 164 and the second side walls 166 cooperatively define a first housing (not labeled) for accommodating the liquid crystal module 10. The back wall 162 defines a second housing (not labeled) adjacent to the first housing, for accommodating the circuit board 12 and associated components thereof. The back wall 162 includes two first hatches 167 positioned along one of the first edges thereof. Each first hatch 167 is located to correspond to one of the pairs of power sockets 122 of the circuit board 12. The first side wall 164 that is adjacent to the first hatches 167 defines the following voids adjacent to each first hatch 167: a groove 163, a pair of first holes 165, and a second hole 168. The groove 163 is located between the first hatch 167 and the first and second holes 165, 168, and acts as a passage for the corresponding leads 102. The second hole 168 is located between and in alignment with the pair of first holes 165. The second hole 168 comprises a long portion (not labeled) adjacent to the groove 163, and a short portion (not labeled) distal from the groove 163 and in communication with the long portion. The chassis 16 can be manufactured by a stamping method.

Figure 4:
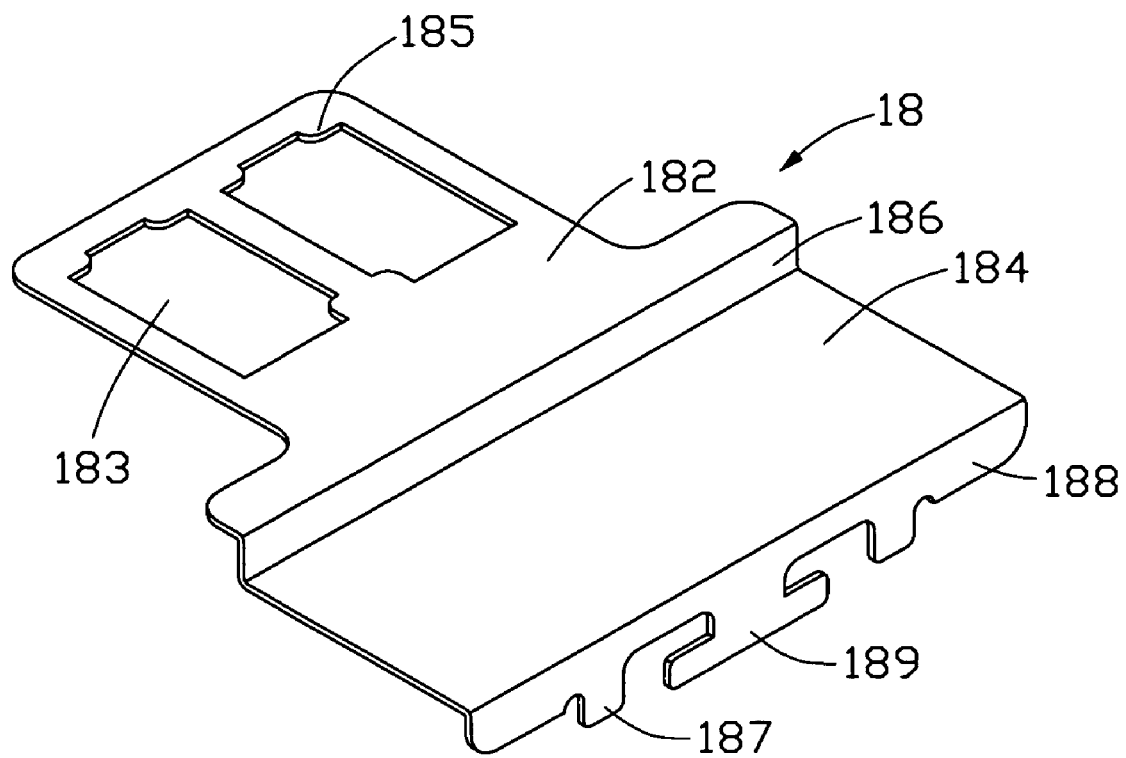
FIG. 4 is an enlarged, isometric view of one of the stabilizing clips of FIG. 1.
Figure 5:
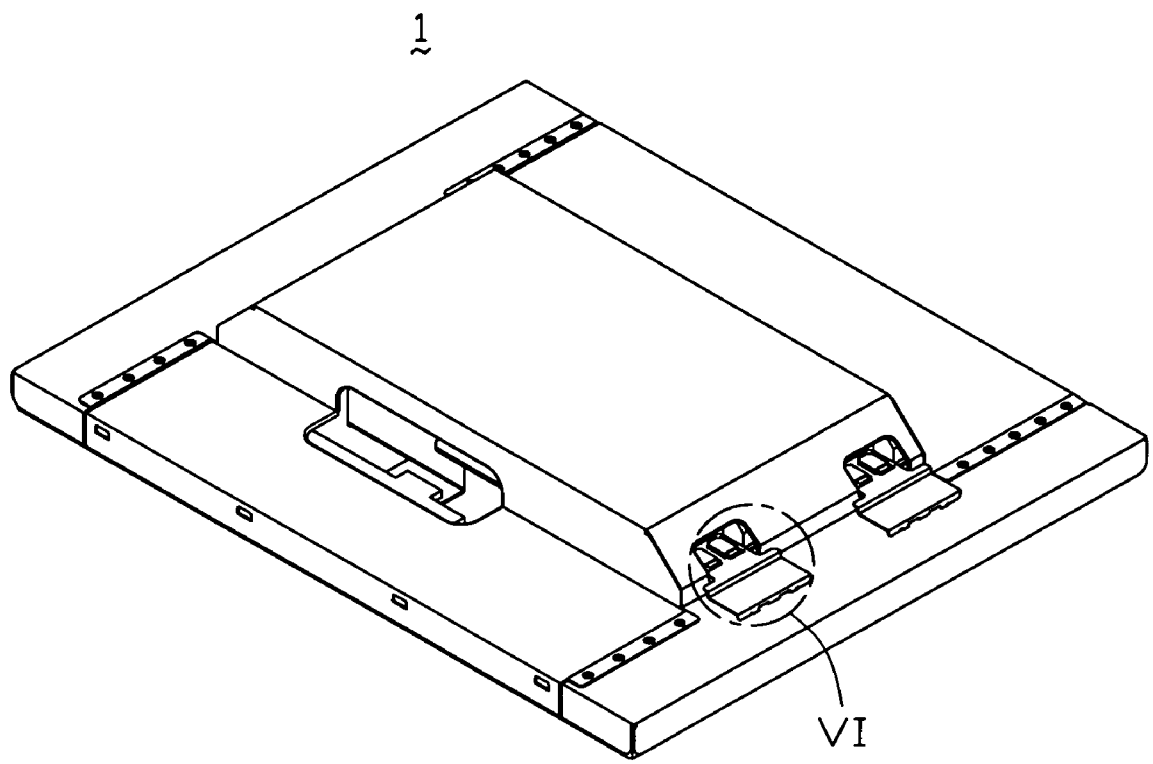
FIG. 5 is a fully assembled view of the liquid crystal display device of FIG. 1.
Figure 6:
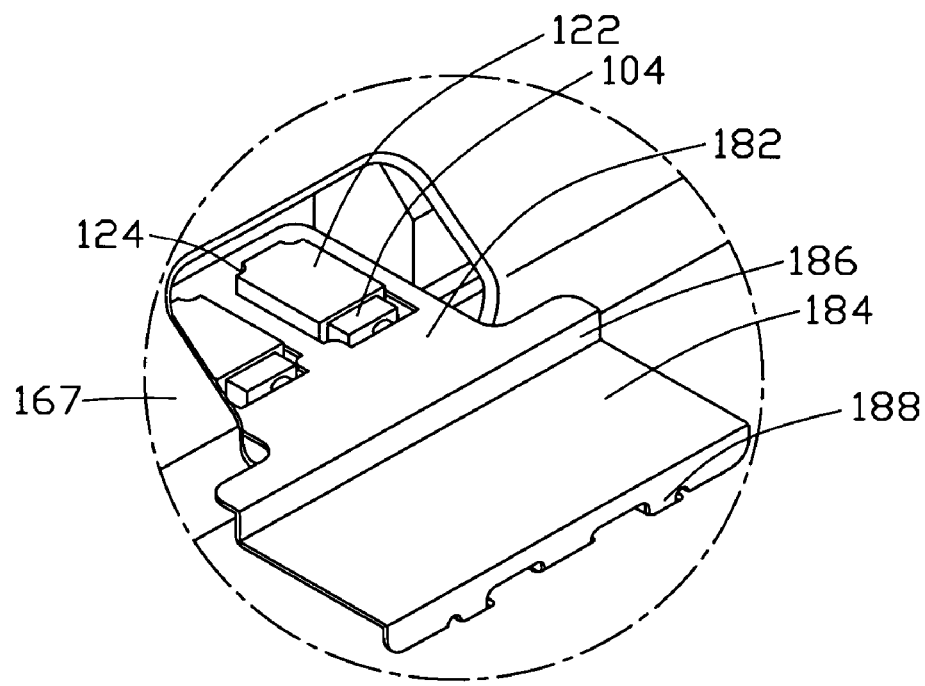
FIG. 6 is an enlarged view of a circled portion VI of FIG. 5.
Figure 7:
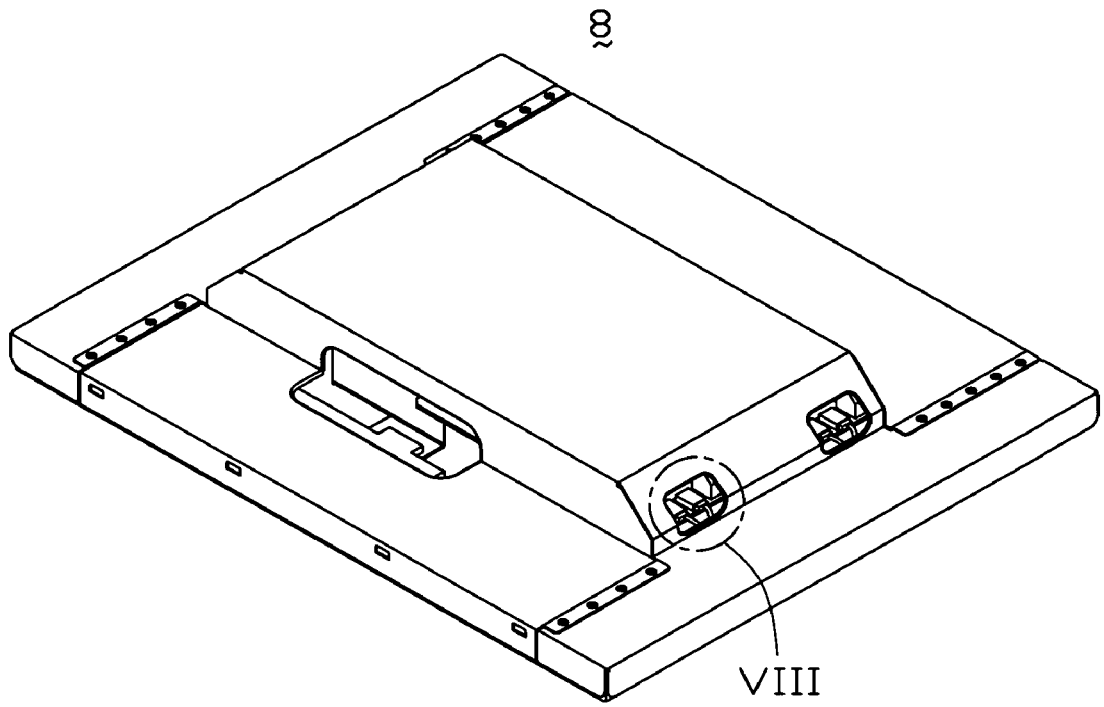
FIG. 7 is an isometric view of a conventional liquid crystal display device.
Figure 8:
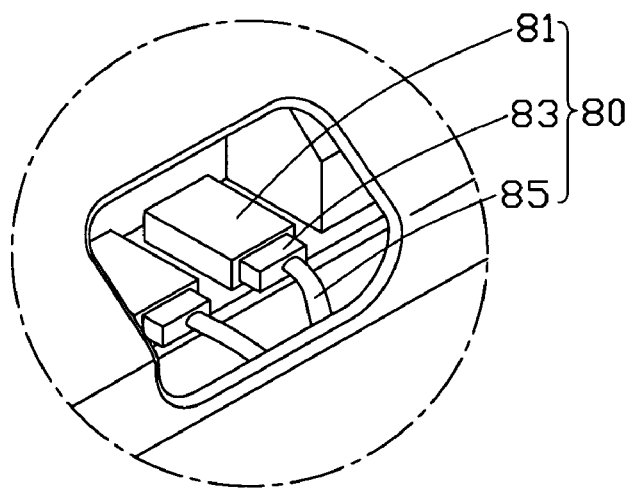
FIG. 8 is an enlarged view of a circled portion VIII of FIG. 7.

Referring to FIG. 4, each stabilizing clip 18 includes a first plate 182, a second plate 184, a connection plate 186, and a flange 188. The connection plate 186 perpendicularly interconnects the first plate 182 and the second plate 184, thereby defining a step thereat. The flange 188 extends perpendicularly down from a distal edge of the second plate 184. The first plate 182 defines two parallel second hatches 183 therein, each second hatch 183 corresponding to one power socket 122 connected with one plug 104. Each second hatch 183 is bounded by three first protrusions 185 at three corners thereof respectively. Two of the first protrusions 185 correspond to the two cutouts 124 of the respective power socket 122, and the other first protrusion 185 corresponds to one side of the respective plug 104. In particular, said other first protrusions 185 of the second hatches 183 are generally adjacent to each other. A pair of spaced second protrusions 187 extends coplanarly down from the flange 188, the second protrusions 187 corresponding to two first holes 165 of the first side wall 164. A third protrusion 189 extends coplanarly down from the flange 188 between the second protrusions 187, the third protrusion 189 corresponding to one second hole 168 of the first side wall 164. The third protrusion 189 includes a neck (not labeled) and two flukes (not labeled) below the neck. The stabilizing clips 18 can be made from fireproof Mylar™, which is relatively inexpensive.

Each stabilizing clip 18 can be installed as follows. First, a corresponding pair of power sockets 122 is connected with its corresponding pair of plugs 104. Then the first plate 182 is inserted into a corresponding first hatch 167 of the chassis 12, so that the first plate 182 is located above the power sockets 122 and plugs 104. The second protrusions 187 are then received in the corresponding first holes 165, and the third protrusion 189 is received through the long portion of the corresponding second hole 168. Second, the stabilizing clip 18 is moved in a direction away from the circuit board 12. The neck of the third protrusion 189 is received in the short portion of the second hole 168, and the flukes of the third protrusion 189 are positioned under the respective first side wall 164. Thereby, the third protrusion 189 is engaged in the second hole 168. Third, the first plate 182 is pressed down. Each power socket 122 with its corresponding plug 104 is received through a corresponding one of the second hatches 183, with two of the first protrusions 185 snugly fitting in the cutouts 124 of the power socket 122, and the other first protrusion 185 limiting the plug 104. All three first protrusions 185 of both second hatches 183 keep the first plate 182 snugly in position, whereby the first plate 182 is prevented from being accidentally lifted up. Further, said other first protrusions 185 of the second hatches 183 prevent the stabilizing clip 18 from accidentally moving back toward the circuit board 12. Thus the stabilizing clips 18 can be fixed to the chassis 16 and the power sockets 122 and plugs 104, whereby a stability of the connections between the leads 102 and the power sockets 122 via the plugs 104 is firmly enhanced. Further, the stabilizing clip 18 covers and protects the leads 102.

Detachment of each stabilizing clip 18 is essentially the reverse of the above-described installation procedure.

In assembly of the liquid crystal display device 1, the chassis 16 is covered over the liquid crystal module 10, the circuit board 12, and the heat sink 14. The second housing (not labeled) accommodates the circuit board 12, the heat sink 14, and associated components of the circuit board 12. The first housing (not labeled) accommodates the liquid crystal module 10. The heat sink 14 thereby interconnects the circuit board 12 and the chassis 16, for conducting heat of the circuit board 12 to the chassis 16. The chassis 16 then dissipates the heat to the ambient environment.

In summary, the liquid crystal display device 1 includes the stabilizing clips 18 which can enhance the stability of the connections between the power sockets 122 of the circuit board 12 and the plugs 104 of the liquid crystal module 10. With this configuration, the risk of loosening of the plugs 104 from the power sockets 122 is reduced or even eliminated, and the risk of the plugs 104 disconnecting from the power sockets 122 is reduced or even eliminated. Moreover, the stabilizing clips 18 can be made from fireproof Mylar™ which is relatively inexpensive. These advantages enable the liquid crystal display device 1 to provide stable and reliable operation at low cost.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display device comprising:
   a chassis;
   a circuit board received in the chassis and comprising a power socket;
   a liquid crystal module received in the chassis, the liquid crystal module comprising a plug electrically connecting with the power socket; and
   a stabilizing clip detachably engaged with the chassis and the power socket, wherein the stabilizing clip comprises a first plate and a second plate disposed in different planes, and a third plate interconnecting the first plate and the second plate, and further comprises a flange perpendicular to the second plate and extending down from a distal edge of the second plate, whereby movement of the plug relative to the power socket is restricted or eliminated.

2. The liquid crystal display device in claim 1, wherein the first plate, the second plate and the third plate together define a step.

3. The liquid crystal display device in claim 2, wherein the third plate is perpendicular to the first plate and the second plate.

4. The liquid crystal display device in claim 1, wherein the power socket comprises two cutouts at two adjacent corners thereof that are opposite to the plug.

5. The liquid crystal display device in claim 4, wherein the first plate comprises a hatch corresponding to the power socket connoted with the plug.

6. The liquid crystal display device in claim 5, wherein the hatch is bounded by a pair of first protrusions at two corners thereof, the first protrusions corresponding to the cutouts of the power socket.

7. The liquid crystal display device in claim 1, wherein the stabilizing clip further comprises two second protrusions and a third protrusion between the second protrusions, the second protrusions and the third protrusion extending down from the flange.

8. The liquid crystal display device in claim 7, wherein the chassis comprises a pair of first holes and a second hole respectively corresponding to the second protrusions and the third protrusion.

9. The liquid crystal display device in claim 8, wherein the liquid crystal module further comprises a lead electrically connecting with an end of the plug distal from the power socket.

10. The liquid crystal display device in claim 9, wherein the chassis further comprises a hatch corresponding to the power socket of the circuit board, and a groove located between the first holes and the hatch of the chassis, the groove receiving the lead therethrough.

11. The liquid crystal display device in claim 1, wherein the chassis comprises a hatch corresponding to the power socket of the circuit board, and the first plate of the stabilizing clip extends through the hatch.

12. The liquid crystal display device in claim 1, wherein the stabilizing clip is made from a fire resistant material.

13. A liquid crystal display device comprising:
a chassis;
a circuit board received in the chassis and comprising a power socket;
a liquid crystal module received in the chassis, the liquid crystal module comprising a plug extending from a wire and electrically connecting with the power socket; and
a stabilizing clip detachably assembled to the chassis; wherein
said clip comprises a section urging at least one of the plug and the wire in position so as to assure reliable connection between the plug and the power socket; and
the chassis defines two apertures, of which one allows the wire to extend from a bottom side of the chassis to an upper side of the chassis, and the other allows a visual inspection of the connection between the plug and the power socket to be done.

14. The liquid crystal display device as in claim 13, wherein a bridge section is formed between said two apertures, which the wire crosses over.

15. A liquid crystal display device comprising:
a chassis;
a circuit board received in the chassis and comprising a power socket,
a liquid crystal module received in the chassis, the liquid crystal module comprising a plug electrically connecting with the power socket; and
a stabilizing clip detachably engaged with the chassis and the power socket, wherein the stabilizing clip comprises a first plate and a second plate disposed in different planes, and a third plate interconnecting the first plate and the second plate, the chassis comprises a hatch corresponding to the power socket of the circuit board, and the first plate of the stabilizing clip extends through the hatch, whereby movement of the plug relative to the power socket is restricted or eliminated.

16. The liquid crystal display device in claim 15, wherein the power socket comprises two cutouts at two adjacent corners thereof that are opposite to the plug.

17. The liquid crystal display device in claim 16, wherein the first plate of the stabilizing clip comprises a hatch corresponding to the power socket connected with the plug.

18. The liquid crystal display device in claim 17, wherein the hatch of the stabilizing clip is bounded by a pair of first protrusions at two corners thereof, the first protrusions corresponding to the cutouts of the power socket.

19. The liquid crystal display device in claim 18, wherein the stabilizing clip further comprises two second protrusions and a third protrusion between the second protrusions, the second protrusions and the third protrusion extending down from the flange, and the chassis comprises a pair of first holes and a second hole respectively corresponding to the second protrusions and the third protrusion.

* * * * *